(12) United States Patent
Kanazawa

(10) Patent No.: US 7,803,298 B2
(45) Date of Patent: Sep. 28, 2010

(54) MOLDING MATERIAL, MOLDED PART, AND METHOD FOR MANUFACTURING THEM

(75) Inventor: Shinichi Kanazawa, Osaka (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 175 days.

(21) Appl. No.: 11/878,333

(22) Filed: Jul. 24, 2007

(65) Prior Publication Data

US 2008/0036119 A1 Feb. 14, 2008

(30) Foreign Application Priority Data

Aug. 14, 2006 (JP) .............................. 2006-220982

(51) Int. Cl.
*D01D 5/40* (2006.01)
*D04H 3/16* (2006.01)
*D21B 1/04* (2006.01)

(52) U.S. Cl. ...................................... 264/140; 264/116

(58) Field of Classification Search ................. 264/140, 264/116

See application file for complete search history.

(56) References Cited

U.S. PATENT DOCUMENTS

| | | | | |
|---|---|---|---|---|
| 3,589,289 A | * | 6/1971 | Gosnell et al. | ........... 101/401.1 |
| 4,340,057 A | * | 7/1982 | Bloch et al. | ................. 604/358 |
| 4,368,280 A | * | 1/1983 | Yui et al. | .................... 523/211 |
| 4,594,513 A | * | 6/1986 | Suzuki et al. | ............ 250/506.1 |

| | | | | |
|---|---|---|---|---|
| 2005/0234153 A1 | * | 10/2005 | Itabashi | ........................ 524/13 |
| 2007/0148465 A1 | * | 6/2007 | Shimura et al. | .......... 428/411.1 |

FOREIGN PATENT DOCUMENTS

JP 2003-313214 11/2003

OTHER PUBLICATIONS

Takeda, Shoji, "As to a Plasticizer for a Biodegradable Resin "Lacticizer"", Arakawa News No. 326, Jul. 2004, pp. 2-7, Arakawa Chemical Industries, Ltd.

* cited by examiner

*Primary Examiner*—Khanh Nguyen
*Assistant Examiner*—Matthew Hoover
(74) *Attorney, Agent, or Firm*—McDermott Will & Emery LLP

(57) ABSTRACT

A method for manufacturing a molded part with an improved convenience and a high degree of efficiency in molding is provided, the molded part containing a biodegradable resin composite, which has the heat resistance in a wide temperature range and which is provided with the flexibility and the elongation in accordance with the use. A kneaded product of a biodegradable resin component and a cross-linkable monomer is prepared. The biodegradable resin component is cross-linked and ground to prepare a biodegradable resin cross-linking product powder. An impregnant at a temperature of 60° C. or higher, and lower than or equal to the melting point or degradation temperature of the biodegradable resin component is impregnated to prepare a molding material composed of a biodegradable resin composite powder. The molding material is heated to a temperature higher than or equal to the melting point of the biodegradable resin component to mold into pellets.

10 Claims, 3 Drawing Sheets

MOLDING MATERIAL, MOLDED PART, AND METHOD FOR MANUFACTURING THEM

BACKGROUND OF THE INVENTION

1. Field of the Invention

The present invention relates to a molding material and a molded part, which contain a biodegradable resin cross-linking product powder or biodegradable resin composite powder, and a method for manufacturing them. In particular, it relates to a biodegradable resin molded part useful for overcoming, in particular, a disposal problem after using in the field where plastic molded parts, e.g., films, containers, cabinets, and other structures and components, are used, a molding material for producing the molded part, and a method for manufacturing them.

2. Description of the Background Art

With respect to petroleum synthetic polymer materials, which are used for many films and containers now, a disposal process thereof alone has raised concerns about various social problems, for example, the global warming due to heat and exhaust gases accompanying disposal through the use of heating, adverse influences on foods and health exerted by toxic substances in combustion gases and in residues after combustion, and reservation of landfills for disposal.

Biodegradable polymer materials, typified by starch and aliphatic polyesters, have been noted as materials for overcoming the above-described disposal problems of the petroleum synthetic polymer materials. The biodegradable polymer materials have a small amount of heat accompanying combustion as compared with that of the petroleum synthetic polymer materials and do not exert adverse influences on the global environment including an ecological system, for example, a cycle of degradation and recomposition can be maintained in the natural environment. Among the biodegradable polymer materials, aliphatic polyester resins have characteristics comparable in the strength and the workability to those of the petroleum synthetic polymer materials, and are materials which have been particularly noted in recent years. Among the aliphatic polyester resins, in particular, polylactic acid is formed from starch supplied from plants, and becomes very inexpensive because of cost reduction based on the mass production in recent years, as compared with the other biodegradable polymer materials. Therefore, many researches have been conducted on applications thereof.

However, biodegradable resins, e.g., starch, cellulose, derivatives thereof, and polylactic acid, are very hard and exhibit substantially no elongation and, thereby, have disadvantages that the absorption of deformation and impact is poor. On the other hand, biodegradable resins, e.g., polybutylene adipate terephthalate, polycaprolactone, and polybutylene succinate, are flexible, but has a disadvantage that the breaking strength is low. As described above, the biodegradable resins do not have both the flexibility and the strength in combination and, therefore, most of them are not easy to use in their natural condition.

In order to improve the characteristics of these biodegradable resins, attempts, which are technologies having been carried out for known plastic resins, to mix resins with each other or to composite resins and modifiers, e.g., plasticizers, have been actively pursued. For example, with respect to the polylactic acid, "ARAKAWA NEWS", No. 326, pages 2-7, issued in July 2004, by Arakawa Chemical Industries, Ltd., describes that a biodegradable resin (that is, polylactic acid) is kneaded with a specific plasticizer to improve the hardness and the brittleness at a temperature lower than or equal to a glass transition temperature of 60° C. and increase the impact resistance to the level of the common plastic.

Japanese Patent Laying-Open No. 2003-313214 proposes that a biodegradable resin is cross-linked by using ionizing radiation to overcome the problem in that the strength is reduced at a glass transition temperature or higher because of excessive flexibility.

However, when these individual technologies are used alone, it is not possible to dissolve both the maintenance of the flexibility and the elongation at a glass transition temperature of the biodegradable resin or lower and the maintenance of the shape and the strength (that is, the heat resistance) simultaneously. That is, the method, which is described in "ARAKAWA NEWS", No. 326, pages 2-7, issued in July 2004, by Arakawa Chemical Industries, Ltd., and in which the plasticizer is mixed simply to the biodegradable resin, merely lowers the glass transition temperature and, thereby, weaken the bonding force between molecules of the biodegradable resin. Therefore, cracking becomes hard to occur because deformation tends to occur, but the restoring force against deformation and impact cannot be imparted. In addition, a vitreous material becomes like clay, and the strength cannot be maintained. As is described in Japanese Patent Laying-Open No. 2003-313214, cross-linking of the biodegradable resin is useful for improving the maintainability of the shape and the strength at a glass transition temperature or higher. However, the thus produced cross-linked biodegradable resin product is hard and brittle, and therefore, does not exhibit the flexibility and the elongation.

The above-described individual technologies can be carried out alone. However, when they are combined, inhibition of cross-linking occurs due to materials composited, and problems occur in that cross-linking cannot be effected and the like. For example, even when the above-described technologies are merely combined, and a composition, in which the biodegradable resin is kneaded with the plasticizer, is cross-linked by application of ionizing radiation or the like, cross-linking does not completely proceed. The causes of the inhibition of cross-linking are believed to be, for example, that the plasticizer eliminates radicals generated by the ionizing radiation and, in addition, when the plasticizer is kneaded antecedently, the plasticizer enters between the molecules of the biodegradable resin so as to inhibit bonding of the biodegradable resin molecules with each other. In order to cross-link the biodegradable resin, the biodegradable resin molecules must be contacted and bonded with each other.

Furthermore, previously known molded parts of the biodegradable resins having a cross-linking structure have been produced by being cross-linked through irradiation after being molded into the shapes of final molded parts, as described in Japanese Patent Laying-Open No. 2003-313214. Therefore, excellent workability and excellent productivity are not exhibited. The cross-linking of the biodegradable resin through irradiation has an advantage that the heat resistance and the shape-maintaining property are improved. Conversely, the above-described cross-linking allows the thermoplasticity of the biodegradable resin to deteriorate. Therefore, the irradiation is heretofore carried out after the molding into the product is carried out, as described above.

However, in order to irradiate after the molding into a desired shape is carried out, it is required to introduce an expensive and high-administrative-cost irradiation facilities into a production site or carry the molded part to the place where the irradiation facilities are disposed. Therefore, expenses, time and effort, and the like are involved, and the workability and the productivity of the molded part are impaired significantly. As a result, an excessive production cost is required.

The present invention has been made in consideration of the above-described problems. Accordingly, it is an object of the present invention to produce efficiently a biodegradable resin molded part having the heat resistance in a wide temperature range not by effecting cross-linking through irradiation after the molding into a desired shape is carried out, but by making it possible that a cross-linked biodegradable resin is made into a powder-shaped or pellet-shaped molding material and the resulting molding material is molded into a desired shape by various molding methods, e.g., inflation molding and injection molding.

SUMMARY OF THE INVENTION

An aspect of the present invention relates to a method for manufacturing a molding material, the method including a biodegradable resin cross-linking product powder preparation step of preparing a biodegradable resin cross-linking product powder, wherein the step including a step (A) of preparing a kneaded product containing a biodegradable resin component and a cross-linkable monomer, a step (B) of cross-linking the biodegradable resin component to form a biodegradable resin cross-linking product, and a step (C) of pulverizing the kneaded product or the biodegradable resin cross-linking product into a powder.

Another aspect of the present invention relates to the above-described method for manufacturing a molding material, wherein the above-described step (A), the above-described step (B), and the above-described step (C) are carried out in that order, and the biodegradable resin cross-linking product is ground into a powder in the above-described step (C).

In the above-described aspect, the kneaded product, in which the cross-linkable monomer is blended into the biodegradable resin component, is prepared in the step (A). Thereafter, the biodegradable resin component in the kneaded product is cross-linked into a network structure so as to have the heat resistance in the step (B), and pulverizing into a powder is carried out in the step (C).

Another aspect of the present invention relates to the above-described method for manufacturing a molding material, wherein the above-described step (A), the above-described step (C), and the above-described step (B) are carried out in that order, and the kneaded product is ground into a powder in the above-described step (C).

In the above-described aspect, the kneaded product, in which the cross-linkable monomer is blended into the biodegradable resin component, is prepared in the step (A). Thereafter, the kneaded product is ground into a powder in the step (C), and the biodegradable resin component is cross-linked so as to prepare the biodegradable resin cross-linking product in the step (B) after the step (C).

The present invention includes a form, in which the above-described step (A), the step (B), and the step (C) are carried out in the order of the step (A), the step (B), and the step (C), and a form, in which the order is the step (A), the step (C), and the step (B). That is, in the present invention, the cross-linking of the biodegradable resin component may be carried out in the kneaded product state or be carried out in the state in which the kneaded product has been powdered. Both forms exert a favorable effect of cross-linking the biodegradable resin component, and there is not a significant difference in the effect between the two forms.

In the method for manufacturing a molding material according to an aspect of the present invention, preferably, the cross-linking in the step (B) is carried out by application of ionizing radiation.

Preferably, the method for manufacturing a molding material according to an aspect of the present invention further includes a biodegradable resin composite powder preparation step of preparing a biodegradable resin composite powder, the step including a step (D) of swelling the biodegradable resin cross-linking product powder with an impregnant containing a plasticizer or a polymerizable monomer to impregnate the biodegradable resin cross-linking product powder with the impregnant, wherein the impregnant in the impregnation is set at a temperature of 60° C. or higher, and lower than or equal to the melting point or the degradation temperature of the biodegradable resin component.

In the method for manufacturing a molding material according to an aspect of the present invention, preferably, the impregnant is the plasticizer, and the plasticizer includes at least one of the types described in the following items (a) to (d):

(a) a plasticizer containing an aliphatic polyester, a derivative thereof, or a rosin derivative;
(b) a plasticizer containing a dicarboxylic acid derivative;
(c) a plasticizer containing a glycerin derivative; and
(d) a plasticizer containing an epoxidized modified oil.

In the method for manufacturing a molding material according to an aspect of the present invention, preferably, the impregnant is the polymerizable monomer, and the polymerizable monomer includes at least one of the types described in the following items (e) to (i):

(e) an acrylic monomer or/and a low-molecular weight polymer having acrylic groups;
(f) a methacrylic monomer or/and a low-molecular weight polymer having methacrylic groups;
(g) a styrene-based monomer;
(h) an allyl monomer or/and a low-molecular weight polymer having allyl groups; and
(i) a vinyl carboxylate-based monomer.

In the method for manufacturing a molding material according to an aspect of the present invention, preferably, the impregnant is the polymerizable monomer, and the biodegradable resin composite powder preparation step further includes a step (E) of polymerizing the impregnant after the step (D).

In the method for manufacturing a molding material according to an aspect of the present invention, preferably, in the step (E), the polymerizable monomer is allowed to graft-polymerize with sites derived from the biodegradable resin component in the biodegradable resin cross-linking product powder by using radicals generated in the step (B).

In the method for manufacturing a molding material according to an aspect of the present invention, preferably, the cross-linking in the step (B) and/or the polymerization in the step (E) are carried out by application of ionizing radiation.

Preferably, the method for manufacturing a molding material according to an aspect of the present invention further includes the step of preparing a mixture of the biodegradable resin composite powder and a biodegradable binder.

Preferably, the method for manufacturing a molding material according to an aspect of the present invention further includes the step (F) of heating the mixture to a temperature higher than or equal to the melting point of the biodegradable resin component so as to pelletize.

Another aspect of the present invention relates to a molding material produced by the manufacturing method according to any one of the above-described aspects.

In the molding material according to an aspect of the present invention, preferably, the biodegradable resin component is composed of one type selected from polysaccharide-based polymers, aliphatic polyester-based polymers, and copolymers of aliphatic polyester and aromatic polyester or a mixture of at least two types.

Another aspect of the present invention relates to a molded part produced by molding through the use of the above-described molding material.

Another aspect of the present invention relates to a method for manufacturing a molded part including a step (G) of heating the above-described molding material to a temperature higher than or equal to the melting point of the biodegradable resin component so as to mold.

Another aspect of the present invention relates to a molded part produced by the above-described method for manufacturing a molded part.

The molding material according to the present invention can improve significantly a convenience in molding in spite of the fact that the biodegradable resin component is cross-linked and composited and, thereby, the heat resistance, the shape maintaining property, and the flexibility are improved. That is, in the production of the molded part, the cross-linking is not a final step, and the molding can be carried out by using a previously known method for molding thermoplastic. Therefore, the use of the biodegradable resin can be increased.

Since the molded part formed from the molding material according to the present invention is provided with the cross-linking network of the biodegradable resin component, the shape and the strength can be maintained reliably even at high temperatures exceeding the glass transition temperature or the softening temperature of the biodegradable resin component. In addition, when an impregnant is combined, the hardness of the molding material and the molded part can be adjusted in accordance with the use by a plasticizer or a polymerizable monomer to be used for impregnation.

In the case where the impregnant containing the plasticizer is used, the cross-linking network of the biodegradable resin component is impregnated with the impregnant even at a temperature lower than or equal to the glass transition temperature of the biodegradable resin component, so that the interaction between molecules of the biodegradable resin component is inhibited. Consequently, a biodegradable resin molding material and a biodegradable resin molded part exhibiting excellent flexibility and elongation without involving the hardness and the brittleness are produced. As described above, according to the method for manufacturing a molded part of an aspect of the present invention, a biodegradable resin molded part, in which improvements of a plurality of material characteristics have been achieved simultaneously in a wide temperature range, can be produced simply by a previously known molding method.

Therefore, the molding material and the molded part according to an aspect of the present invention can be applied to general uses, in which petroleum synthetic polymers are used now, in particular uses, e.g., rubber suction cups, in which soft vinyl chloride is used. Furthermore, it can also be used as shape memory products required to have both the flexibility and the shape memory property.

The biodegradable resin component can be polymer-alloyed with an impregnant by using the impregnant containing a polymerizable monomer and polymerizing the impregnant. In this case, the biodegradable resin molding material and molded part having properties resulting from combination of the characteristics of the biodegradable resin component and the polymer produced by polymerization of the impregnant can be prepared. Therefore, functions in accordance with the purpose can be imparted to the biodegradable resin component, for example, a biodegradable resin component having a low softening temperature is modified to have a property of being hard even at a softening temperature or higher.

In the case where the biodegradable resin composite powder, in which the hardness has been changed by using the impregnant, is mixed and dispersed in the biodegradable binder composed of the same biodegradable resin as the original biodegradable resin component, a material similar to a polymer alloy can be provided. In this case, since the material similar to a polymer alloy can be produced from materials which are derived from the same raw material and have different hardnesses, a molding material having excellent affinity, mixing property, and dispersibility can be provided.

Furthermore, since the molding material and the molded part according to an aspect of the present invention have the biodegradability, the influence exerted on the ecological system in the natural world is very small and, therefore, various disposal problems of known plastic can be overcome. In addition, from the point that the biodegradable resin molding material and molded part according to an aspect of the present invention can be imparted with unprecedented flexibility, application to a field, in which the biodegradable resin have not been able to use, can be expected. It is possible to apply to medical devices, e.g., injection syringes and catheters, to be used inside or outside the living body because no influence is exerted on the living body.

In consideration of the biodegradability and the biocompatibility or the in vivo degradability, the biodegradable resin molding material or molded part according to an aspect of the present invention can be applied to, for example, a controlled release system of a useful substance, the system taking advantage of the supporting property of them. That is, in the case where a useful substance, e.g., a medicine or a drug, serving as a plasticizer is impregnated into the biodegradable resin cross-linking product powder so as to prepare a composite, as the biodegradable resin component is degraded, the useful substance impregnated therein is released gradually. As described above, the biodegradable resin molding material and molded part according to an aspect of the present invention can be applied to technical fields in a wide range.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
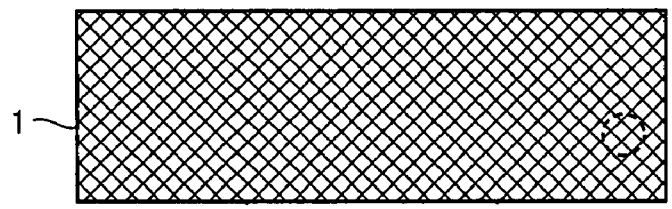
FIG. 1 is a schematic diagram of a biodegradable resin cross-linking product prepared by a manufacturing method according to an aspect of the present invention.

An aspect of the present invention relates to a method for manufacturing a molding material, the method including a biodegradable resin cross-linking product powder preparation step of preparing a biodegradable resin cross-linking product powder, wherein the step including a step (A) of preparing a kneaded product containing a biodegradable resin component and a cross-linkable monomer, a step (B) of cross-linking the biodegradable resin component to form a biodegradable resin cross-linking product, and a step (C) of pulverizing the kneaded product or the biodegradable resin cross-linking product into a powder.

In the above-described aspect, the biodegradable resin component is cross-linked in the step (B), so that a network structure is formed and the heat resistance is imparted.

It is essential that the biodegradable resin component to be used in the present invention is a biodegradable resin in which a cross-linking structure can be introduced. In particular, it is preferable that the biodegradable resin component is at least one type selected from polysaccharide-based resins, aliphatic polyester-based resins, and copolymers of aliphatic polyester and aromatic polyester.

Specific examples thereof include:

polysaccharide-based biodegradable resins including natural polysaccharide, e.g., cellulose, starch, chitin, chitosan, and alginic acid, and derivatives thereof produced by acetylation, esterification, or the like;

aliphatic polyester-based biodegradable resins, e.g., L-form and D-form polylactic acid, polycaprolactone (PCL), polybutylene succinate (PBS), polyethylene succinate, and polyethylene succinate adipate; and biodegradable resins, which are copolymers of aliphatic polyester and aromatic polyester, typified by, for example, polybutylene adipate terephthalate (PBAT), in which an aromatic structure, e.g., terephthalic acid, is introduced into the above-described resin. These may be used alone or in combination of at least two types.

The cross-linkable monomer is not specifically limited as long as the monomer can be cross-linked by application of ionizing radiation, that is, radiation having an ionizing function, or the like. Examples thereof include acrylic or methacrylic cross-linkable monomers and allyl cross-linkable monomers.

Examples of acrylic or methacrylic cross-linkable monomers include 1,6-hexanediol di(meth)acrylate, 1,4-butanediol di(meth)acrylate, trimethylolpropane tri(meth)acrylate, ethylene oxide-modified trimethylolpropane tri(meth)acrylate, propylene oxide-modified trimethylolpropane tri(meth) acrylate, ethylene oxide-modified bisphenol A di(meth)acrylate, diethylene glycol di(meth)acrylate, dipentaerythritol hexaacrylate, dipentaerythritol monohydroxypentaacrylate, caprolactone-modified dipentaerythritol hexaacrylate, pentaerythritol tri(meth)acrylate, pentaerythritol tetra(meth) acrylate, polyethylene glycol di(meth)acrylate, tris(acryloxyethyl)isocyanurate, and tris(methacryloxyethyl) isocyanurate.

Examples of allyl cross-linkable monomers include triallyl isocyanurate, trimethallyl isocyanurate, triallyl cyanurate, trimethallyl cyanurate, diallylamine, triallylamine, diallyl chlorrendate, allyl acetate, allyl benzoate, allyl dipropyl isocyanurate, allyl octyl oxalate, allyl propyl phthalate, butyl allyl malate, diallyl adipate, diallyl carbonate, diallyl dimethylammonium chloride, diallyl fumarate, diallyl isophthalate, diallyl malonate, diallyl oxalate, diallyl phthalate, diallyl propyl isocyanurate, diallyl sebacate, diallyl succinate, diallyl terephthalate, diallyl tatolate, dimethyl allyl phthalate, ethyl allyl malate, methyl allyl fumarate, methyl methallyl malate, and diallyl monoglycidyl isocyanurate.

It is preferable that the cross-linkable monomer to be used in the present invention is the ally cross-linkable monomer because a high degree of cross-linking can be achieved even at a relatively low concentration. Most of all, triallyl isocyanurate is particularly preferable because a high cross-linking effect is exerted on the biodegradable resin component. When triallyl cyanurate, the structure of which can be mutually converted to the structure of triallyl isocyanurate by heating, is used, substantially the same effect is exerted.

Preferably, the cross-linkable monomer is blended at a ratio of 0.5 parts by mass or more, and 15 parts by mass or less relative to 100 parts by mass of biodegradable resin component, although depending on the type of the biodegradable resin component. A more preferable amount of blending of cross-linkable monomer is 3 parts by mass or more, and 8 parts by mass or less. This is because if the amount of blending of cross-linkable monomer is less than 3 parts by mass, the effect of cross-linking the biodegradable resin component by the cross-linkable monomer is not exerted satisfactorily, the strength of the composite tends to deteriorate at high temperatures higher than or equal to the glass transition temperature or the softening temperature, and, at worst, there is a possibility that the maintenance of the shape becomes difficult. On the other hand, the amount of blending of cross-linkable monomer is specified to be 8 parts by mass or less because if the amount of blending of cross-linkable monomer exceeds 8 parts by mass, mixing of an entire amount of cross-linkable polymer into the biodegradable resin component becomes difficult, and substantially, the difference in the cross-linking effect becomes not significant.

More preferably, the amount of blending of cross-linkable monomer is 5 parts by mass or more in order to ensure the shape-maintaining effect at high temperatures higher than or equal to the glass transition temperature or the softening temperature, and 10 parts by mass or less is more preferable in order to increase the content of the biodegradable resin component so as to increase the biodegradability.

Besides the biodegradable resin component and the cross-linkable monomer, other components may be blended into the kneaded product prepared in the step (A) of the present invention, as long as the purpose of the present invention is not impaired.

For example, resin components other than the biodegradable resin component; curable oligomers; additives, e.g., various stabilizers, flame retardants, antistatic agents, fungicides, and viscosity-imparting agents; inorganic or organic fillers, e.g., glass fibers, glass beads, metal powders, talc, mica, and silica; coloring agents, e.g., dies and pigments; and the like can also be blended.

In the step (A), the kneaded product containing the biodegradable resin component and the cross-linkable monomer is prepared. The kneading can be carried out by a method in which, for example, the biodegradable resin component is brought into the stage of being melted or dissolved through heating of the biodegradable resin component to a temperature higher than or equal to the melting point or the softening point or through dissolution of the biodegradable resin component into a solvent, and kneading and mixing are carried out after the cross-linkable monomer and, if necessary, the above-described other additives are added.

It is preferable that in the step (A), the kneaded product containing the above-described biodegradable resin component, the cross-linkable monomer, and, if desired, other components is molded into the shape of pellets, sheet, rod, or the like in order to facilitate the handling. In particular, molding into pellets is preferable because pulverizing is carried out in a downstream operation.

In the manufacturing method according to the present invention, the biodegradable resin component is cross-linked to form a biodegradable resin cross-linking product in the step (B), and the kneaded product or the biodegradable resin cross-linking product is ground into a powder in the step (C). In the present invention, operations are carried out typically in the order of the step (A), the step (B), and step (C), or in the order of the step (A), the step (C), and the step (B), and thereby, the biodegradable resin cross-linking product powder can be prepared. The difference in the effect is not significant between the operations in the two orders, and the effect of cross-linking the biodegradable resin component is exerted satisfactorily.

In the case where the operation is carried out in the order of the step (A), the step (B), and step (C), the biodegradable resin component contained in the kneaded product prepared in the step (A) is cross-linked in the step (B) to form the biodegradable resin cross-linking product, and furthermore, the resulting biodegradable resin cross-linking product is ground in the step (C). In this manner, the biodegradable resin cross-linking product powder can be produced.

On the other hand, in the case where the operation is carried out in the order of the step (A), the step (C), and step (B), the kneaded product prepared in the step (A) is ground into a powder in the step (C), and the biodegradable resin component in the powder is cross-linked in the step (B) to form the biodegradable resin cross-linking product. In this manner, the biodegradable resin cross-linking product powder can be produced.

A known method can be used as the method for forming the cross-linking structure in the biodegradable resin component in the step (B). Examples thereof include a method in which ionizing radiation is applied and a method in which a chemical initiator is used. Preferably, the method, in which ionizing radiation is applied, is used on the ground that the cross-linking can be carried out reliably with a smaller amount of cross-linking agent.

For the ionizing radiation, $\gamma$ rays, X rays, $\beta$ rays, $\alpha$ rays, and the like can be used. However, in the industrial production, $\gamma$ ray irradiation through the use of cobalt-60 and electron beam irradiation through the use of an electron beam accelerator are preferable.

Preferably, the application of ionizing radiation is carried out in an inert atmosphere, from which the air is removed, or in a vacuum. This is because if active species generated by the application of ionizing radiation are bonded to oxygen in the air and are deactivated, the cross-linking effect may deteriorate.

In the method for manufacturing a molding material according to an aspect of the present invention, preferably, a biodegradable resin composite powder preparation step of preparing a biodegradable resin composite powder is further included, the step including a step (D) of swelling the biodegradable resin cross-linking product powder with an impregnant containing a plasticizer or a polymerizable monomer to impregnate the biodegradable resin cross-linking product powder with the impregnant, wherein the impregnant in the impregnation is set at a temperature of 60° C. or higher, and lower than or equal to the melting point or the degradation temperature of the biodegradable resin component.

In the present invention, for example, by the combination with the step (D), even when the biodegradable resin component and the impregnant are composited by immersion in the impregnant containing the plasticizer or polymerizable monomer so as to swell, the biodegradable resin component has already been cross-linked before impregnation. Therefore, in the case where the biodegradable resin composite powder is formed in the present invention as well, the cross-link between molecules of the biodegradable resin component is maintained in an almost perfect form. In the case where the power of not cross-linked biodegradable resin component is immersed in the heated impregnant, the biodegradable resin is either dissolved or not swelled. In order to swell with the impregnant while the shape of the powder is maintained, it is an indispensable condition that the cross-linking network has been introduced in the powder. When the cross-linking network has been introduced in the powder, the reduction of strength does not occur in contrast to that in the case where the biodegradable resin is cross-linked after the impregnant containing the plasticizer or the polymerizable monomer is mixed. Consequently, the shape maintaining property of the molding material can be improved.

In the case where the biodegradable resin cross-linking product powder is impregnated with the impregnant in the present invention, since the biodegradable resin component has already been cross-linked through radiation or the like when the impregnation is carried out, the resistance against the cross-linking means, e.g., radiation, and cross-linking inhibition are not necessary taken into consideration in the selection of the impregnant. Therefore, the impregnant can be arbitrarily selected on the basis of the affinity with the biodegradable resin component, and the cross-linking state of the biodegradable resin component can be controlled independently of the impregnant.

As described above, in the present invention, it is important that the biodegradable resin component is almost perfectly cross-linked and, thereafter, the biodegradable resin cross-linking product powder is prepared. It is preferable that substantially 100% of the biodegradable resin component in the biodegradable resin cross-linking product powder is cross-linked.

The degree of cross-linking of the biodegradable resin component can be evaluated on the basis of the gel fraction as an index. Preferably, the gel fraction of the biodegradable resin cross-linking product powder before being immersed into the impregnant containing the plasticizer or the polymerizable monomer is 95 percent by mass or more, and more preferably is 98 percent by mass or more. Most preferably, the gel fraction is substantially 100 percent by mass and, therefore, the cross-linking is carried out completely.

The above-described gel fraction is a value measured by the following method. That is, the dry mass of the sample is weighed accurately. The sample is wrapped in a 200-mesh stainless steel gauze, and is boiled in a chloroform solution for 48 hours. Thereafter, the sol portion dissolved in chloroform is removed, and the remaining gel portion is taken. The gel portion is dried at 50° C. for 24 hours, chloroform in the gel is removed, and the dry mass of the gel is measured. The gel fraction is calculated from the resulting values on the basis of the following equation.

$$\text{gel fraction(percent by mass)} = (\text{gel fraction dry mass}/\text{sample dry mass}) \times 100$$

When the gel fraction is measured by the above-described method, 100 percent by mass may be exceeded substantially due to the experimental error. In this case as well, the amount of cross-linking points, that is, cross-linking density is important. The content of the impregnant can be controlled by increasing the cross-linking density. This takes advantage of the fact that the structure change and the volume change becomes resistant to occurrence as the cross-linking network becomes dense. It is possible to change the cross-linking density so as to control the amount of impregnation of the impregnant by changing the amount of the cross-linkable monomer, the amount of application of the ionizing radiation to be used for cross-linking, or the like in the formation of the biodegradable resin cross-linking product powder.

Preferably, the amount of application of the ionizing radiation in the cross-linking of the biodegradable resin component is 50 kGy or more, and 200 kGy or less.

Even when the amount of application of the ionizing radiation is 1 kGy or more, and 10 kGy or less, cross-linking of the biodegradable resin component is observed depending on the amount of blending of the cross-linkable monomer. However, it is preferable that the amount of application of the ionizing radiation is 50 kGy or more in order to cross-link about 100% of biodegradable resin component. Furthermore, it is more preferable that the amount of application of the ionizing radiation is 80 kGy or more in order to suppress the change in shape and facilitate uniform swelling when immersion in a liquid impregnant is carried out in a downstream operation.

On the other hand, it is preferable that the amount of application of the ionizing radiation is 200 kGy or less. This is because the biodegradable resin component has a property of collapsing when the resin is independently applied with radiation and, therefore, if the amount of application of the ionizing radiation exceeds 200 kGy, cross-linking may not be effected, but degradation may proceed conversely. Preferably, the amount of application of the ionizing radiation is 150 kGy or less, and more preferably is 100 kGy or less.

For the cross-linking method in the step (B), in place of the method in which the cross-linking is carried out by application of ionizing radiation, a method, in which the biodegradable resin component is mixed with the cross-linkable monomer and the chemical initiator and, thereafter, the resulting mixture is molded into a desired shape and is heated to a thermal decomposition temperature of the chemical initiator so as to form a biodegradable resin cross-linking product, may be used.

The cross-linkable monomer in this case may be the same substance as that used in the case of the cross-linking by using the ionizing radiation.

Preferable examples of chemical initiators include peroxide catalysts, e.g., dicumyl peroxide, propionitrile peroxide, benzoyl peroxide, di-t-butyl peroxide, diacyl peroxide, pelargonyl peroxide, myristoyl peroxide, t-butyl-perbenzoic acid, and 2,2'-azobisisobutylonitrile, and other catalysts for initiating polymerization of the monomer, the catalysts serving as chemical initiators which generate peroxide radicals through thermal decomposition.

The temperature condition for cross-linking can be selected appropriately in accordance with the type of the chemical initiator. Preferably, the cross-linking is carried out in an inert atmosphere, from which the air is removed, or in a vacuum, as in the case of irradiation.

In the step (C), the method for pulverizing the kneaded product or the biodegradable resin cross-linking product into a powder is not specifically limited. Examples thereof include a method to triturate in a mortar, a method, typified by a ball mill, to pulverize through application of vibration under the condition that hard materials are present together, a method to pulverize in the hard and brittle condition after cooling with liquid nitrogen or the like (freeze pulverizing method), and a method to impact-pulverize. In general, a polymer is softened or melted by the heat during pulverizing and is elongated or deformed by application of a force, so that it is hard to pulverize the polymer in contrast to inorganic materials. In particular, in the case where polylactic acid having a glass transition temperature of about 60° C. or the like is used as the biodegradable resin component, it is difficult to carry out the pulverizing by ambient temperature pulverizing which is inexpensive as compared with the freeze pulverizing.

However, in the case where the cross-linking structure is introduced into the biodegradable resin component through radiation or the like in the present invention, deformation of the biodegradable resin component due to softening or melting can be prevented. Therefore, it is preferable that the cross-linking step (step (B)) is carried out before the pulverizing step (step (C)) from the view point of ease of pulverizing.

The biodegradable resin cross-linking product powder can be prepared through the step including the above-described step (A), the step (B), and the step (C). In the present invention, a molding material containing the biodegradable resin cross-linking product powder prepared by the above-described method can be provided. In addition, a biodegradable resin composite powder is further prepared through the following steps and, thereby, a molding material containing the biodegradable resin composite powder can also be provided.

In addition to the above-described step (A), the step (B), and the step (C), preferably, the method for manufacturing a molding material according to an aspect of the present invention further includes the biodegradable resin composite powder preparation step of preparing a biodegradable resin composite powder, the step including a step (D) of swelling the biodegradable resin cross-linking product powder with an impregnant containing a plasticizer or a polymerizable monomer to impregnate the biodegradable resin cross-linking product powder with the impregnant. In the step (D), preferably, the impregnant in the impregnation is set at a temperature of 60° C. or higher, and lower than or equal to the melting point or the degradation temperature of the biodegradable resin component.

For the method to swell the biodegradable resin cross-linking product powder, a method, in which the biodegradable resin cross-linking product powder is immersed in a heated liquid-state impregnant, may be used, or a method, in which the biodegradable resin cross-linking product powder is mixed with the impregnant and, thereafter, heating is carried out, may be used. Since the biodegradable resin cross-linking product powder is in the state of having a small apparent specific gravity, that is, in the bulky state of having many gaps and spaces between particles, for example, the impregnant is allowed to be contained in the gaps by an amount nearly equal to that of the biodegradable resin component and, thereby, the state, in which excess impregnant does not enter, can be ensured. Consequently, the impregnant can be substantially uniformly impregnated into the biodegradable resin cross-linking product powder by, for example, a method in which the biodegradable resin cross-linking product powder and the impregnant are mixed at a desired ratio in a hermetically sealed container and heating is carried out.

The impregnant containing the plasticizer or the polymerizable monomer to be used is not specifically limited as long as the impregnant is in a liquid state at ambient temperature or the impregnant becomes a liquid by being heated and melted even when it is a solid at ambient temperature.

According to the research conducted by the inventors of the present invention, the softening temperatures and the glass transition temperatures of most of biodegradable resins are about 60° C., and they are softened in the neighborhood of this temperature. Therefore, it is preferable that the temperature of the impregnant is set at 60° C. or higher in the impregnation in the step (D). When the temperature of the impregnant is set at 60° C. or higher, the composite can be produced very efficiently. In the case where a biodegradable resin cross-linking product having a large molecular weight is used, preferably, the temperature of the impregnant is set at 80° C. or higher, further preferably at 100° C. or higher.

The optimum temperature of the impregnant during the impregnation varies depending on the type of biodegradable resin component, the type of impregnant, and the combination of the biodegradable resin component and the impregnant. For example, in the case where an aliphatic polyester-based biodegradable resin component generally having a glass transition temperature of 60° C. or lower is used, it is favorable that the temperature of the impregnant is specified to be 60° C. or higher. Even in the case where a polysaccharide-based biodegradable resin component generally having a high glass transition temperature or softening temperature, the biodegradable resin cross-linking product powder can be satisfactorily swelled with the impregnant by heating the impregnant to a temperature of 80° C. to 100° C. in the impregnation.

On the other hand, most of the plasticizers and the polymerizable monomers, which are liquids at ambient temperature, tend to vaporize or transpire by being heated. Therefore, the temperature of the above-described plasticizer or the polymerizable monomer must be set at a temperature lower than the vaporization temperature. For example, a part of the impregnants, e.g., cross-linkable monomers, have boiling points in the neighborhood of 80° C. to 150° C., and when the temperature becomes higher than the above-described range, they tend to vaporize, so that it becomes difficult to raising the temperature of the impregnant. Consequently, in the case where an easy-to-vaporize impregnant is used, preferably, the temperature of the impregnant is set at 80° C. or lower in the impregnation. Even when a hard-to-vaporize impregnant is used, it is preferable that the upper limit of the temperature of the impregnant is specified to be 120° C. to 140° C. Furthermore, the impregnant must be in a chemically stable state and in a liquid state. Therefore, preferably, the temperature of the impregnant is set at a temperature lower than, or equal to the melting point or the degradation temperature of the biodegradable resin component.

As a result, assuming that a general impregnant is used, preferably, the temperature of the impregnant in the impregnation is specified to be 60° C. or higher, more preferably be 80° C. or higher. Preferably, the temperature of the impregnant is specified to be 130° C. or lower, more preferably be 120° C. or lower.

However, in the case where an impregnant containing a plasticizer, such as an epoxidized modified oil, which is stable at high temperatures, the temperature of the impregnant may be a temperature exceeding the melting point of the biodegradable resin component. In this case, the temperature of the impregnant can be specified to be 180° C. or lower, for example.

The swelling time of the biodegradable resin cross-linking product powder in the step (D) is not specifically limited. In general, the diffusion phenomenon is proportionate to the square of the thickness and, therefore, it is preferable that the swelling time is specified to be within the range of 5 to 120 minutes in accordance with the particle size, and further preferably be within the range of 30 to 60 minutes. In the case where the biodegradable resin cross-linking product powder having an average particle diameter of about 500 μm is used, the swelling time may be about 60 minutes. Furthermore, in the case where the biodegradable resin cross-linking product powder having an average particle diameter of 100 μm or less is used, adequate swelling can be ensured when the swelling time is about 5 minutes.

In the present invention, since the biodegradable resin cross-linking product is made into the powder before the impregnation of the impregnant, there is an advantage that the impregnation of the impregnant into the biodegradable resin can be carried out very speedily as compared with the impregnation in the case where the impregnant is impregnated into a large mass, such as a molded part.

When the biodegradable resin cross-linking product is made into the powder, the impregnation ratio of the impregnant in the composite of the biodegradable resin cross-linking product and the impregnant becomes easy to control. That is, a specific amount of the impregnant is uniformly impregnated into the powder by the above-described method and, thereby, the content can be regulated. When the impregnant is impregnated as described above, an excess impregnant is not required. In the case where the impregnant is impregnated into a large mass of biodegradable resin component, such as a molded part, since the biodegradable resin component is immersed in an excessive liquid of the impregnant, the content of the impregnant must be controlled by the immersion time or the like. Therefore, the control of the content of the impregnant is difficult.

In the present invention, an impregnant containing a plasticizer or an impregnant containing a polymerizable monomer can be used as the impregnant.

In the case where the plasticizer is used as the impregnant, since the impregnant inhibits the interaction between molecules of the biodegradable resin component, the biodegradable resin composite powder has very excellent flexibility and elongation even at a temperature lower than, or equal to the glass transition temperature or the softening temperature, and exhibits excellent impact resistance and elastic plasticity.

In general, this is believed to be based on the effect similar to that a heat-shrinkable material has a shape memory property based on the cross-linking structure. That is, in order to exert the elastic pliability, not only the flexibility, which refers to weak repulsion and high deformability against a load from the outside, but also the shape restoring property, which refers to a property to return to an original shape while repelling the load, is required. The heat-shrinkable material is produced so as to have a shape fixed while it is in the elongated state. The heat-shrinkable material becomes flexible only after being heated in the use and, thereby, can exert the shape restoring capability. In the case where the impregnant containing the plasticizer is used in the present invention, the molded part exerts flexibility even at ambient temperature and exhibits elastic pliability even at ambient temperature due to the plasticizer.

Since the impregnant containing the plasticizer must be impregnated into the biodegradable resin component, it is preferable that the impregnant has high affinity with the biodegradable resin component. Therefore, preferably, the impregnant has at least the polarity and the molecular weight is not large, so that the biodegradable resin or a derivative thereof is most suitable.

Specifically, a plasticizer containing at least one of the types described in the following items (a) to (d) is used favorably.

(a) A plasticizer containing an aliphatic polyester, a derivative thereof, or a rosin derivative
  (b) A plasticizer containing a dicarboxylic acid derivative
  (c) A plasticizer containing a glycerin derivative
  (d) A plasticizer containing a epoxidized modified oil Among them, in order to maintain the biodegradability of the biodegradable resin composite powder prepared in the present invention at a higher level, it is preferable that the plasticizer has the biodegradability. Specifically, the plasticizers recognized to have the biodegradability are favorable, and examples thereof include biodegradable resins, aliphatic polyesters having low molecular weights or derivatives thereof, dicarboxylic acid derivatives, glycerin derivatives, and lactones.

Example of aliphatic polyesters and derivatives thereof include polycondensates and copolycondensates of aliphatic diols and aliphatic dicarboxylic acids or derivatives thereof and copolycondensates of aliphatic diols, aliphatic dicarboxylic acids or derivatives thereof, and hydroxycarboxylic acids. More specific examples include polymers and copolymers synthesized from at least one selected from α-hydroxycarboxylic acids (e.g., glycolic acid, lactic acid, and hydroxybutyric acid), hydroxydicarboxylic acids (e.g., malic acid), hydroxytricarboxylic acids (e.g., citric acid), and the like or mixtures thereof. Most of all, preferably, the biodegradable resin is used as the aliphatic polyester.

Preferably, the molecular weights of the aliphatic polyesters and derivatives thereof are smaller than the molecular weight of the biodegradable resin component constituting the biodegradable resin composite powder. Specifically, it is preferable that the molecular weight is $1 \times 10^5$ or less, more preferably is $1 \times 10^4$ or less, and further preferably is within the range of $1 \times 10^2$ to $1 \times 10^3$.

For the derivative of the aliphatic polyester, known compounds produced by chemically modifying the aliphatic polyester can be used. Most of all, preferably, "LACTCIZER-GP-4001™", which is a plasticizer containing a biodegradable resin derivative, produced by Arakawa Chemical Industries, Ltd., is used.

Examples of rosin derivatives include raw material rosin, e.g., gum rosin, wood rosin, and tall oil resin; stabilized rosin and polymerized rosin produced by a disproportionation or hydrogenation treatment of the raw material rosin; and other rosin esters, strengthened rosin esters, rosin phenols, and rosin-modified phenol resins.

Most of all, it is particularly preferable to use "LACTCIZER-GP-2001™, which is a plasticizer containing a rosin derivative, produced by Arakawa Chemical Industries, Ltd., in the present invention.

Examples of dicarboxylic acid derivatives include esterification products of dicarboxylic acids, metal salts of dicarboxylic acids, and anhydrides of dicarboxylic acids.

Examples of dicarboxylic acids in the dicarboxylic acid derivatives include linear-chain or branched-chain, saturated or unsaturated aliphatic dicarboxylic acids having the carbon number of 2 to 50, particularly the carbon number of 2 to 20, aromatic dicarboxylic acids having the carbon number of 8 to 20, and polyether dicarboxylic acids having a number average molecular weight of 2,000 or less, particularly of 1,000 or less. Most of all, aliphatic dicarboxylic acids having the carbon number of 2 to 20, e.g., oxalic acid, malonic acid, succinic acid, glutaric acid, adipic acid, sebacic acid, and decanedicarboxylic acid, and aromatic dicarboxylic acid, e.g., phthalic acid, terephthalic acid, and isophthalic acid, are preferable.

Esterification products of dicarboxylic acids are preferable as the dicarboxylic acid derivatives. Examples of esterification products of dicarboxylic acids include bis(methyl diglycol)adipate, bis(ethyl diglycol)adipate, bis(butyl diglycol)adipate, methyl diglycol butyl diglycol adipate, methyl diglycol ethyl diglycol adipate, ethyl diglycol butyl diglycol adipate, dibenzyl adipate, benzyl methyl diglycol adipate, benzyl ethyl diglycol adipate, benzyl butyl diglycol adipate, bis(methyl diglycol)succinate, bis(ethyl diglycol)succinate, bis(butyl diglycol)succinate, methyl diglycol ethyl diglycol succinate, methyl diglycol butyl diglycol succinate, ethyl diglycol butyl diglycol succinate, dibenzyl succinate, benzyl methyl diglycol succinate, benzyl ethyl diglycol succinate, benzyl butyl diglycol succinate, ethyl methyl diglycol adipate, ethyl butyl diglycol adipate, butyl methyl diglycol adipate, butyl butyl diglycol adipate, ethyl methyl diglycol succinate, ethyl ethyl diglycol succinate, ethyl butyl diglycol succinate, butyl methyl diglycol succinate, butyl ethyl diglycol succinate, butyl butyl diglycol succinate, dimethyl phthalate, diethyl phthalate, dibutyl phthalate, bis(2-ethylhexyl) phthalate, di-n-octyl phthalate, diisodecyl phthalate, butyl benzyl phthalate, diisononyl phthalate, and ethylphthalyl ethylene glycolate.

Preferable dicarboxylic acid derivatives are esterification products, which is typified by acetylation products, of dicarboxylic acids, e.g., oxalic acid, malonic acid, succinic acid, glutaric acid, adipic acid, and phthalic acid. Most of all, it is particularly preferable in the present invention to use "DAIFFATY-101 (trade name)", which is an adipic acid ester, produced by Daihachi Chemical Industry Co., Ltd.

Examples of glycerin derivatives include derivatives produced by esterifying glycerin. More specifically, examples thereof include glycerin aliphatic acid monoesters, glycerin aliphatic acid diesters, and glycerin aliphatic acid triesters.

In the case where glycerin aliphatic acid esters are used as the glycerin derivatives, examples of aliphatic acids constituting the glycerin aliphatic acid esters include saturated or unsaturated aliphatic acids having the carbon number of 2 to 22. Specific examples thereof include acetic acid, propionic acid, butyric acid (butanoic acid), isobutyric acid, valeric acid (pentanoic acid), isovaleric acid, caproic acid (hexanoic acid), heptanoic acid, caprylic acid, nonanoic acid, capric acid, isocapric acid, lauric acid, myristic acid, palmitic acid, stearic acid, behenic acid, 12-hydroxystearic acid, oleic acid, linoleic acid, erucic acid, and 12-hydroxyoleic acid. When the glycerin aliphatic acid esters are glycerin aliphatic acid diesters or glycerin aliphatic acid triesters, two types or three types of aliphatic acid constituting the esters may be the same or different with each other.

Most of all, acetylated glycerin, e.g., triacetyl glyceride (commonly called triacetin) or "RIKEMAL PL (series)", which is acetylated monoglyceride, produced by Riken Vitamin Co., Ltd., is suitable for the glycerin derivative in the present invention.

Examples of epoxidized modified oils include an epoxidized soybean oil, an epoxidized caster oil, and the like.

Besides, useful substances, e.g., medicines, agricultural chemicals, drugs, and foods, may be used as the plasticizer. When the above-described useful substances are used as the impregnant and the cross-linking network of the biodegradable resin component is allowed to carry the useful substance, a controlled release system, in which the useful substance is released gradually as the biodegradable resin molded part is biodegraded, can be constructed.

In the case where the polymerizable monomer is used as the impregnant, for the purpose of fixing the polymerizable monomer in the cross-linking network of the biodegradable resin cross-linking product powder, it is possible to use a method in which the polymerizable monomer is allowed to graft-polymerize with the biodegradable resin cross-linking product powder, a method in which the polymerizable monomer is composited with the biodegradable resin component, the polymerizable monomer is polymerized in the inside of the biodegradable resin component, and the biodegradable resin component and the polymer are polymer-alloyed, or the like. By the polymer alloying, the polymer produced by polymerization of the biodegradable resin component and the polymerizable monomer can be imparted with properties, e.g., the hardness, including combined characteristics of both the biodegradable resin component and the polymer resulting from the polymerizable monomer.

Furthermore, in the case where the biodegradable resin composite powder is prepared in the present invention, it is also an advantage that the state, in which the impregnant is very uniformly and finely dispersed in the biodegradable resin component, can be formed. When the biodegradable resin component and the impregnant are composited in the known method, the two are kneaded physically, heated, and mixed so as to disperse. Therefore, fine dispersion, such as polymer alloying and nanocompositing, cannot be achieved without using a compatibilizer. On the other hand, in the manufacturing method according to the present invention, the fine dispersion state of the impregnant can easily be formed without using a chemical, e.g., a compatibilizer, by forming a fine network structure when the biodegradable resin cross-linking product powder is formed. Such the fine network structure of the biodegradable resin cross-linking product powder can be formed by controlling the condition, e.g., the amount of the cross-linkable monomer and the amount of irradiation. As described above, in the manufacturing method according to the present invention, there is no fear of variations in mixing of the materials and remaining large masses not completely mixed or lumps not completely dissolved, which result incidentally in the case where the biodegradable resin component and the impregnant are composited merely by mixing or blending.

Preferably, the impregnant containing the polymerizable monomer contains at least one of the types described in the following items (e) to (i).

(e) An acrylic monomer or/and a low-molecular weight polymer having acrylic groups (f) A methacrylic monomer or/and a low-molecular weight polymer having methacrylic groups (g) A styrene-based monomer (h) An allyl monomer or/and a low-molecular weight polymer having allyl groups (i) A vinyl carboxylate-based monomer Examples of acrylic monomers and methacrylic monomers include acrylic acid, methacrylic acid, methyl (meth)acrylate, 1,6-hexanediol di(meth)acrylate, 1,4-butanediol di(meth)acrylate, trimethylolpropane tri(meth)acrylate, ethylene oxide-modified trimethylolpropane tri(meth)acrylate, propylene oxide-modified trimethylolpropane tri(meth)acrylate, ethylene oxide-modified bisphenol A di(meth)acrylate, diethylene glycol di(meth)acrylate, dipentaerythritol hexaacrylate, dipentaerythritol monohydroxypentaacrylate, caprolactone-modified dipentaerythritol hexaacrylate, pentaerythritol tri(meth)acrylate, pentaerythritol tetra(meth)acrylate, polyethylene glycol di(meth)acrylate, tris(acryloxyethyl)isocyanurate, tris(methacryloxyethyl)isocyanurate, and glycidyl methacrylate.

Examples of low-molecular weight polymers having acrylic groups or low-molecular weight polymers having methacrylic groups include low-molecular weight polymers which have molecular weights of about 100 to 1,000 and which are produced by polymerizing at least one of the above-described acrylic monomers and the methacrylic monomers.

Examples of styrene-based monomers include styrene, p-methylstyrene, and the like, which have a functional group primarily at a para position, specifically, styrene sulfonate, chlorostyrene, α-methylstyrene, tert-butylstyrene, and chloromethylstyrene.

Examples of allyl monomers include triallyl isocyanurate, trimethallyl isocyanurate, triallyl cyanurate, trimethallyl cyanurate, diallylamine, triallylamine, diallyl chlorrendate, allyl acetate, allyl benzoate, allyl dipropyl isocyanurate, allyl octyl oxalate, allyl propyl phthalate, butyl allyl malate, diallyl adipate, diallyl carbonate, diallyl dimethylammonium chloride, diallyl fumarate, diallyl isophthalate, diallyl malonate, diallyl oxalate, diallyl phthalate, diallyl propyl isocyanurate, diallyl sebacate, diallyl succinate, diallyl terephthalate, diallyl tatolate, dimethyl allyl phthalate, ethyl allyl malate, methyl allyl fumarate, methyl methallyl malate, and diallyl monoglycidyl isocyanurate.

Examples of low-molecular weight polymers having allyl groups include low-molecular weight polymers which have molecular weights of about 100 to 1,000 and which are produced by polymerizing at least one of the above-described allyl monomers.

Examples of vinyl carboxylate-based monomers include vinyl acetate, vinyl propionate, vinyl butyrate, vinyl hexanoate, vinyl octanoate, vinyl decanoate, vinyl myristate, vinyl palmitate, vinyl stearate, vinyl pivalate, vinyl octylate, vinyl monochloroacetate, divinyl adipate, vinyl methacrylate, vinyl crotonate, vinyl sorbate, vinyl benzoate, and vinyl cinnamate.

In the present invention, the heated impregnant is impregnated into the biodegradable resin cross-linking product powder. The biodegradable resin cross-linking product powder in the swelling state is cooled to nearly room temperature and, thereby, a biodegradable resin composite powder, in which the biodegradable resin component and the impregnant are composited, is produced.

When the molding material prepared in the present invention contains the above-described biodegradable resin composite powder, the impregnant has been impregnated into the cross-linking network of the biodegradable resin component.

As described above, the hardness of the biodegradable resin composite powder can be adjusted by selecting the plasticizer or the polymerizable monomer to be impregnated into the biodegradable resin cross-linking product powder. For example, in the case where the biodegradable resin which is hard at ambient temperature and which exhibits poor toughness, e.g., relatively hard polysaccharide-based polymer or polylactic acid, is used as the biodegradable resin component, it becomes possible to reduce the hardness of the biodegradable resin composite powder and impart the flexibility and the impact resistance by impregnation of the plasticizer. In the case where polybutylene adipate terephthalate or polycaprolactone, which is relatively flexible, or polylactic acid, which becomes soft at a temperature higher than or equal to the glass transition temperature of 60° C., is used as the biodegradable resin component, it is possible to impregnate the polymerizable monomer as the impregnant so as to allow the biodegradable resin composite powder to have the required hardness and modified properties, e.g., a high shape maintainability and a high Young's modulus.

As described above, the biodegradable resin cross-linking product powder is immersed in the impregnant capable of adjusting the hardness, the biodegradable resin cross-linking product powder swelled by including the impregnant is cooled and, thereby, the biodegradable resin composite powder having the hardness adjusted in accordance with the use can be produced.

In the case where the polymerizable monomer is used as the impregnant, preferably, the biodegradable resin composite powder preparation step further includes a step (E) of polymerizing the impregnant after the step (D).

In the present invention, preferably, the cross-linking in the step (B) and/or the polymerization in the step (E) are carried out by application of ionizing radiation. In the step (E), preferably, the polymerizable monomer is polymerized by using ionizing radiation as in the cross-linking of the biodegradable resin component in the step (B). In that case, as in the cross-linking of the biodegradable resin component, γ rays, X rays, β rays, α rays, and the like can be used as the ionizing radiation. For the industrial production, γ ray irradiation through the use of cobalt-60 and electron beam irradiation through the use of an electron beam accelerator are preferable.

With respect to the amount of application of the ionizing radiation, although somewhat depending on the amount of the monomer impregnated, the amount of application required in the cross-linking of the biodegradable resin component is not necessary, and a favorable effect can be exerted at a few kGy to a few tens of kGy.

In the case where the polymerizable monomer impregnation step (step (D)) is carried out immediately after the biodegradable resin component cross-linking step (step (B)) by using radiation or the like, in the step (E), the polymerizable monomer is allowed to graft-polymerize with sites derived from the biodegradable resin component in the biodegradable resin cross-linking product powder by using radicals generated in the step (B) even when the polymerization by application of ionizing radiation or the like is not carried out after the step (D). That is, when the immersion in the impregnant is carried out before radicals generated in the step (B) disappear, the polymerizable monomer is allowed to graft-polymerize with the biodegradable resin cross-linking product powder by using the remaining radicals generated in the step (B). In this case, there is an advantage that an intentional operation is not required in the step (E) for polymerizing the polymerizable monomer after impregnation of the impregnant.

The radicals generated by application of ionizing radiation or the like disappear gradually by a reaction with oxygen and the like in the air and fluctuations due to heat. In the case where the cross-linking by the ionizing radiation is adopted in the step (B), although depending on the types of the biodegradable resin component and the impregnant, the polymerizable monomer can be polymerized in the step (E) without application of ionizing radiation when the step (D) of immersing the biodegradable resin cross-linking product powder in the impregnant is carried out within about 1 to 24 hours after the cross-linking is carried out.

The molding material containing the biodegradable resin cross-linking product powder or the biodegradable resin composite powder can be molded into a desired shape by heating in a step described below, where the biodegradable resin cross-linking product powder or the biodegradable resin composite powder is melted, adhered to the adjacent resin, and is integrated so as to become a molded part. However, this property is significantly limited because the biodegradable resin component has been cross-linked. Therefore, preferably, the method for manufacturing a molding material according to an aspect of the present invention further includes separately the step of adding a biodegradable binder to the biodegradable resin cross-linking product powder or the biodegradable resin composite powder and preparing a mixture of the two. The adhesion between the biodegradable resin cross-linking product powders with each other or the adhesion between the biodegradable resin composite powders with each other can be improved by mixing the biodegradable binder.

For the biodegradable binder, all biodegradable resins which have been described as examples of the biodegradable resins usable for the biodegradable resin component can be used. In particular, it is preferable that the same type of biodegradable resin is used for the biodegradable resin component and the biodegradable binder. In this case, the adhesion between the biodegradable resin cross-linking product powder or the biodegradable resin composite powder and the biodegradable binder can be further improved. However, different biodegradable resins and petroleum-derived resins can also be used for the biodegradable resin component and the biodegradable binder, although depending on the use. From the view point of easiness in mixing, it is preferable that the biodegradable binder is a powder.

Preferably, the amount of mixing of the biodegradable binder is 0.1 to 1 times the amount of the biodegradable resin cross-linking product powder or the biodegradable resin composite powder.

It can be assumed that the biodegradable binder is polymer-alloyed with the biodegradable resin cross-linking product powder or the biodegradable resin composite powder. In general, the polymer alloy is a mixture of a polymer serving as a harder segment and a polymer serving as a softer segment. In the present invention, the biodegradable resin component and the plasticizer or the polymerizable monomer are composited so as to become softer or harder than the original biodegradable resin component. The resulting biodegradable resin composite powder having a modified hardness is mixed with the biodegradable binder, which is the same type with the original biodegradable resin component, and is dispersed, so that a polymer composed of segments having different hardnesses, that is, a polymer alloy, can be formed.

In general, with respect to the polymer alloy, mutual mixing and dispersion of segments formed from different polymers are difficult. However, in the present invention, when the same resin is used for the biodegradable resin component and the biodegradable binder, there is an advantage that the affinity, mixing property, and the dispersibility between the biodegradable resin cross-linking product powder or the biodegradable resin composite powder and the biodegradable binder become very excellent.

In the present invention, a molding material composed of pellet-shaped biodegradable resin composite can be produced through a step (F) of heating the biodegradable resin composite powder to a temperature higher than or equal to the melting point of the biodegradable resin component so as to pelletize.

The molding material composed of the pellet-shaped biodegradable resin composite can be molded in a manner similar to that for general thermoplastic materials. In the case where the above-described molding material composed of the pellet-shaped biodegradable resin composite is used, a step of molding into a molded part may become a final step, in spite of the fact that the biodegradable resin component has been subjected to cross-linking in advance. Therefore, the molded part can be produced by using the already-existing molding machine whatever the working facilities, so that the convenience is improved. In particular, when the mixture of the biodegradable resin composite powder and the biodegradable binder is heated to a temperature higher than or equal to the melting point of the biodegradable resin component so as to pelletize in the step (F), the strength of the molded part can be increased by enhancing the adhesion between particles of the biodegradable resin composite powder, so that more favorable molding materials can be provided.

In addition, the present invention provides a molding material produced by any one of the above-described manufacturing methods. In the molding material according to an aspect of the present invention, preferably, the biodegradable resin component is composed of one type selected from polysaccharide-based polymers, aliphatic polyester-based polymers, and copolymers of aliphatic polyester and aromatic polyester or a mixture of at least two types.

Furthermore, the present invention relates to a molded part produced by molding through the use of any one of the above-described molding materials. The molded part can be produced by molding into the desired shape, e.g., a sheet and a tube, by a previously known method, e.g., melt-extrusion molding, injection molding, inflation molding, rolling molding, and calender molding, for molding thermoplastic through the use of any one of the above-described molding materials.

The present invention relates to a method for manufacturing a molded part further including a step (G) of heating the molding material containing any one of the biodegradable resin cross-linking product powder, the biodegradable resin composite powder, and the pellet-shaped biodegradable resin composite to a temperature higher than or equal to the melting point of the biodegradable resin component so as to mold. The molding material is molded into a required shape by the step (G), so that a desired molded part can be produced. The present invention relates to a molded part produced by the above-described method for manufacturing a molded part.

In the present invention, since the cross-linked biodegradable resin component is contained in the powder-shaped or pellet-shaped molding material, characteristics resulting from the cross-linking are imparted and, thereafter, molding into a molded part having an arbitrary shape can be carried out while the characteristics are maintained.

With respect to the known cross-linked product, in particular, the cross-linked product having a perfect cross-linking structure exhibiting a gel fraction of nearly 100%, particularly as in the present invention, it has been impossible to mold after cross-linking is once carried out, as in the thermosetting resin. However, the molding material, which is prepared in the present invention, containing any one of the biodegradable resin cross-linking product powder, the biodegradable resin composite powder, and the pellet-shaped biodegradable resin composite can be subjected to the molding by using a common method for molding thermoplastic, while the characteristics resulting from the cross-linking and the property of holding the impregnant, e.g., plasticizer, are maintained. This is because the biodegradable resin cross-linking product powder, the biodegradable resin composite powder, or the pellet-shaped biodegradable resin composite serving as the molding material is melted by heating so as to become a cross-linked polymer having modified properties, e.g., flexibility, of the biodegradable resin, and exhibit fluidity, so that uniform distribution in the mold can be achieved.

As described above, when the molding material prepared in the present invention is used, since the molded part, which is a final product, can be produced by using the already-existing molding machine, the molding material of the present invention exhibits high convenience. Therefore, according to the present invention, the use of the biodegradable resin material can be further facilitated. In particular, when the biodegradable resin composite powder and the biodegradable binder are mixed and pelletized, further favorable molding materials are prepared.

The molding material and the molded part of the present invention are allowed to have desired properties, e.g., the heat resistance and the hardness, by using the plasticizer or the polymerizable monomer as the impregnant, and furthermore, by combining the impregnant and the biodegradable resin component.

In the case where the molding material and the molded part of the present invention contain the above-described impregnant, preferably, the content of the impregnant is 5 percent by mass or more, and 60 percent by mass or less. In the case where the plasticizer is used as the impregnant in order to ensure the flexibility at a temperature lower than or equal to the glass transition temperature of the biodegradable resin composite, preferably, the content of the impregnant is 5 percent by mass or more. Preferably, the content of the impregnant is specified to be 10 percent by mass or more in order to further exert the effect of improving the flexibility, and 20 percent by mass or more is particularly preferable.

The upper limit of the content of the impregnant is specified to be 60 percent by mass because if the content of the impregnant exceeds 60 percent by mass, precipitation of the impregnant, so-called bleed, may occur. More preferably, the content of the impregnant is specified to be 55 percent by mass or less.

Here, the content of the impregnant is a value measured by the following method. That is, the mass of a sample before being mixed with the impregnant is measured at ambient temperature in advance. After the sample is impregnated with the impregnant, the temperature is returned to ambient temperature, and the mass of the sample is measured. The impregnant content is calculated from the resulting values on the basis of the following equation.

$$\text{impregnant content(percent by mass)} = \{(A-B)/A\} \times 100$$

A: mass of sample after being impregnated with impregnant and returned to ambient temperature B: mass of sample at ambient temperature before being mixed with impregnant Furthermore, the molding material of the present invention can be applied to a molecular sieve for gel filtration, liquid chromatography, and the like by allowing the cross-linking network structure of the biodegradable resin cross-linking product powder or the biodegradable resin composite powder to contain a polar solvent, e.g., methanol or dimethyl sulfoxide (DMSO). This is because the biodegradable resin composite powder prepared in the present invention can exhibit a gel structure through the use of the above-described polar solvent. It is possible to use widely in the field of separation analysis technology by controlling the cross-linking structure of the biodegradable resin cross-linking product powder or the biodegradable resin composite powder by the above-described method.

First Embodiment

Each of the embodiments according to the present invention will be described below. A method for manufacturing a molding material composed of the biodegradable resin cross-linking product powder, according to the first embodiment will be described.

In the first embodiment, a kneaded product of a biodegradable resin component and a cross-linkable monomer is prepared in a step (A). The biodegradable resin component is softened by heating, or the biodegradable resin component is dissolved or dispersed into a solvent capable of dissolving the biodegradable resin component. A biodegradable resin component, in which a cross-linking structure can be introduced, is used as the biodegradable resin component. In the present embodiment, cellulose acetate (CDA), which is a polysaccharide-based biodegradable resin, L-form or D-form polylactic acid, which is an aliphatic polyester-based biodegradable resin, polycaprolactone (PCL), polybutylene succinate (PBS), and polybutylene adipate terephthalate (PBAT), which is a copolymer of an aliphatic polyester and aromatic polyester, and the like can be used.

A cross-linkable monomer is added to the biodegradable resin component. Triallyl isocyanurate can be used as the cross-linkable monomer. The amount of addition of cross-linkable monomer may be 3 parts by mass or more, and 8 parts by mass or less relative to 100 parts by mass of biodegradable resin component.

After the cross-linkable monomer is added, agitation and mixing are carried out to homogenize the cross-linkable monomer and, thereby, a kneaded product of the biodegradable resin component and the cross-linkable monomer is prepared. The kneading temperature and the kneading time are appropriately selected in accordance with the types of the biodegradable resin component and the cross-linkable monomer.

In the case where a solvent is added in advance, the solvent is removed by drying. Preferably, the kneaded product of the biodegradable resin component and the cross-linkable monomer is made into a pellet-shaped kneaded product by being pelletized with a pelletizer, for example. In the present embodiment, the case where the pellet-shaped kneaded product is used will be described.

In a step (B), the ionizing radiation is applied to the resulting pellet-shaped kneaded product to cross-link the biodegradable resin component, so that a pellet-shaped biodegradable resin cross-linking product is produced.

The application of the ionizing radiation can be carried out by electron beam irradiation with an electron beam accelerator. The amount of irradiation is appropriately selected within the range of 80 kGy or more, and 200 kGy or less in accordance with the amount of blending of the cross-linkable monomer and the like. In particular, the gel fraction of the biodegradable resin cross-linking product resulting from the application of the ionizing radiation can be controlled at 80 percent by mass or more.

In a step (C), the thus produced pellet-shaped biodegradable resin cross-linking product is ground into a powder.

The method for making the biodegradable resin cross-linking product into a powder is not specifically limited. Examples thereof include a method to triturate in a mortar, a method to pulverize by application of vibration under the condition that hard materials are present together, as typified by a ball mill, a method to pulverize in the hard and brittle condition after cooling with liquid nitrogen or the like (freeze pulverizing method), and a method to impact-pulverize. In the present embodiment, the freeze pulverizing method or the impact pulverizing method is adopted.

In this manner, the molding material composed of the biodegradable resin cross-linking product powder according to the first embodiment can be produced.

Second Embodiment

A method for manufacturing a molding material composed of the biodegradable resin cross-linking product powder, according to the second embodiment will be described.

In the second embodiment, the order of the step (B) and the step (C) in the first embodiment is exchanged. That is, the pellet-shaped kneaded product produced in the step (A) is ground in advance (step (C)), the ionizing radiation is applied to cross-link under the same condition as in the first embodiment (step (B)) and, thereby, a biodegradable resin cross-linking product powder is produced.

Other configurations, operations and effects are similar to those in the first embodiment. Therefore, the explanation thereof are not repeated.

Third Embodiment

A method for manufacturing a molding material composed of the biodegradable resin composite powder, according to the third embodiment will be described.

The manufacturing method in the third embodiment includes a step (step D) of immersing the biodegradable resin cross-linking product powder of the first embodiment or the second embodiment produced through the steps (A) to (C) into a impregnant containing a plasticizer.

In the present embodiment, a plasticizer containing an aliphatic polyester derivative or a rosin derivative, a plasticizer containing a dicarboxylic acid derivative, and a plasticizer containing a glycerin derivative is used as the plasticizer. In particular, the plasticizer containing a glycerin derivative is used favorably.

In the present embodiment, the biodegradable resin cross-linking product powder and the impregnant are uniformly mixed at a desired ratio in a hermetically sealed container. Heating is carried out for 30 minutes to 120 minutes in a constant temperature bath set at 60° C. to 120° C., so that the biodegradable resin cross-linking product powder is impregnated with the impregnant substantially uniformly.

Cooling to nearly room temperature is carried out while the impregnant is impregnated into the biodegradable resin cross-linking product powder and the biodegradable resin cross-linking product powder is swelled. The cooling may be carried out gradually by standing to cool, or quenching may be carried out by water cooling or the like.

The thus produced molding material composed of the biodegradable resin composite powder of the present embodiment contains 5 percent by mass to 60 percent by mass of impregnant.

Fourth Embodiment

A method for manufacturing a molding material composed of the biodegradable resin composite powder, according to the fourth embodiment will be described.

In the fourth embodiment, an impregnant containing a polymerizable monomer is used in place of the impregnant containing the plasticizer in the third embodiment and, thereafter, a step (step (E)) of polymerizing the polymerizable monomer in the biodegradable resin cross-linking product powder so as to composite the impregnant (polymerizable monomer) is carried out, so that a molding material composed of the biodegradable resin composite powder is produced.

Specifically, the impregnant containing the polymerizable monomer is impregnated into the biodegradable resin composite powder and, thereafter, the ionizing radiation is applied again to polymerize the polymerizable monomer (step (E)).

With respect to the polymerization of the polymerizable monomer, the amount of irradiation required in the step (B) is not necessary, and the amount of application of the ionizing radiation is specified to be 10 to 80 kGy. The other irradiation conditions are similar to those in the step of cross-linking the biodegradable resin component (step (B)) in the first embodiment.

For the impregnant of the present embodiment, a monomer or/and a low-molecular weight polymer capable of polymerizing can be used. Specifically, an acrylic monomer or/and a low-molecular weight polymer having acrylic groups, a methacrylic monomer or/and a low-molecular weight polymer having methacrylic groups, a styrene-based monomer, an allyl monomer or/and a low-molecular weight polymer having allyl groups, and a vinyl monomer or/and a low-molecular weight polymer having vinyl groups can be used. Among them, the methacrylic monomer can be used favorably.

The impregnation of the impregnant in the present embodiment is also carried out in a manner similar to that in the third embodiment. However, when a volatile polymerizable monomer or the like is used, the temperature of the impregnant in the impregnation is set at a somewhat low temperature of 60° C. to 100° C.

With respect to the biodegradable resin composite powder produced by the above-described method, the impregnant containing the polymerizable monomer is impregnated and, thereafter, the polymerizable monomer is polymerized, so that the polymerizable monomer is polymer-alloyed with the biodegradable resin. Consequently, the biodegradable resin composite powder has properties in which the characteristics of the polymer resulting from polymerization of the biodegradable resin component alone and the characteristics of the polymer resulting from polymerization of the impregnant alone are combined. For example, in the case where a methacrylic acid monomer serving as a filler is impregnated into cross-linked polycaprolactone serving as a biodegradable resin component and is made into polymethacrylic acid, polycaprolactone, which has a low softening temperature so that the shape maintaining property is impaired at 60° C., is reinforced by polymethacrylic acid having a property of being hard up to a glass transition temperature of 166° C. so as to exhibit a property of being hard even at 60° C. or higher.

Fifth Embodiment

A method for manufacturing a molding material composed of the biodegradable resin composite, according to the fifth embodiment will be described.

In the fifth embodiment, merely the method for polymerizing the polymerizable monomer of the fourth embodiment is changed. The biodegradable resin cross-linking product powder is immersed into the polymerizable monomer (step (D)) within 1 to 5 hours after cross-linking through the use of ionizing radiation in the step (B). Consequently, the polymerizable monomer is allowed to graft-polymerize with the biodegradable resin component through the use of radicals generated in the step (B), so that the step (E) is carried out substantially. That is, in the fifth embodiment, the polymerizable monomer is polymerized without carrying out the application of ionizing radiation in contrast to the fourth embodiment.

Since the polymerization of the polymerizable monomer in the fifth embodiment takes advantage of radicals generated in the step (B), it is preferable that the time period after the step (B) is carried out until the step (D) is carried out is minimized. However, the polymerizable monomer can be satisfactorily polymerized as long as the step (D) is carried out within 1 to 5 hours after the step (B) is completed.

In the case where, for example, 24 hours or more have elapsed after the step (B) was carried out and radicals of ionizing radiation generated in the step (B) have disappeared or remaining radicals have decreased, the step (E) may be carried out by applying ionizing radiation again so as to polymerize the polymerizable monomer, as in the fourth embodiment.

Sixth Embodiment

A method for manufacturing a molding material composed of the pellet-shaped biodegradable resin composite, according to the sixth embodiment will be described.

In the sixth embodiment, the biodegradable resin composite powder produced in any one of the third embodiment to fifth embodiment is mixed with a ground biodegradable binder so as to prepare the pellet-shaped biodegradable resin composite.

Specifically, the ground biodegradable binder composed of the biodegradable resin powder is mixed to the biodegradable resin composite powder, where the amount of mixing of the biodegradable binder is 0.1 to 1 times the amount of the biodegradable resin composite powder, and heating to a temperature higher than or equal to the melting point of the biodegradable resin component is carried out in the step (E). Molding into pellets is carried out with a pelletizer, so that the pellet-shaped biodegradable resin composite is prepared.

In the present invention, the biodegradable binder may not be blended, and merely the biodegradable resin composite powder may be pelletized.

One form of a method for manufacturing a molding material composed of the pellet-shaped biodegradable resin composite will be described in detail with reference to FIG. 1 to FIG. 8.

FIG. 1 shows a biodegradable resin cross-linking product 1 produced by cross-linking a kneaded product of the biodegradable resin component and the cross-linkable monomer, the cross-linking product being produced through the step (A) and the step (B).

Figure 2:
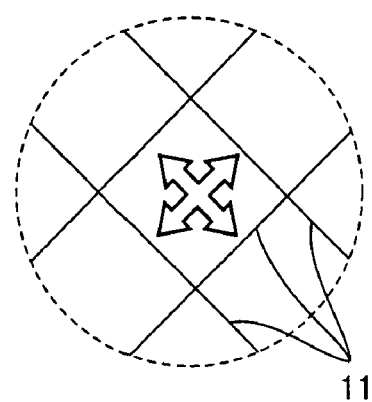
FIG. 2 is a magnified schematic diagram of a portion surrounded by a dotted line shown in FIG. 1.

When the biodegradable resin cross-linking product 1 is microscopically observed, as shown in FIG. 2, molecules of the biodegradable resin component form a cross-linking network by the cross-linking structures 11 and, thereby, are mutually constrained. In this state, there is an advantage that deformation is resistant to occurrence even at a temperature higher than or equal to the glass transition temperature. However, there is a disadvantage that the biodegradable resin cross-linking product 1 is hard and brittle and exhibits poor durability at a temperature lower than or equal to the glass transition temperature because interactions between molecules of the biodegradable resin component (arrows shown in FIG. 2) take place.

Figure 3:
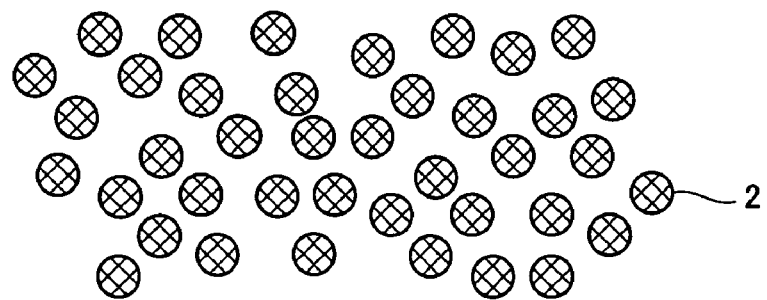
FIG. 3 is a schematic diagram of a biodegradable resin cross-linking product powder prepared by a manufacturing method according to an aspect of the present invention.

Therefore, as shown in FIG. 3, the biodegradable resin cross-linking product 1 is made into a powder-shaped biodegradable resin cross-linking product powder 2 in the step (C). In FIG. 1 to FIG. 3, the biodegradable resin component is made into a powder after being cross-linked. However, in the present invention, the cross-linking structure may be imparted after the kneaded product containing the biodegradable resin component and the polymerizable monomer is made into a powder, as described above.

Figure 4:
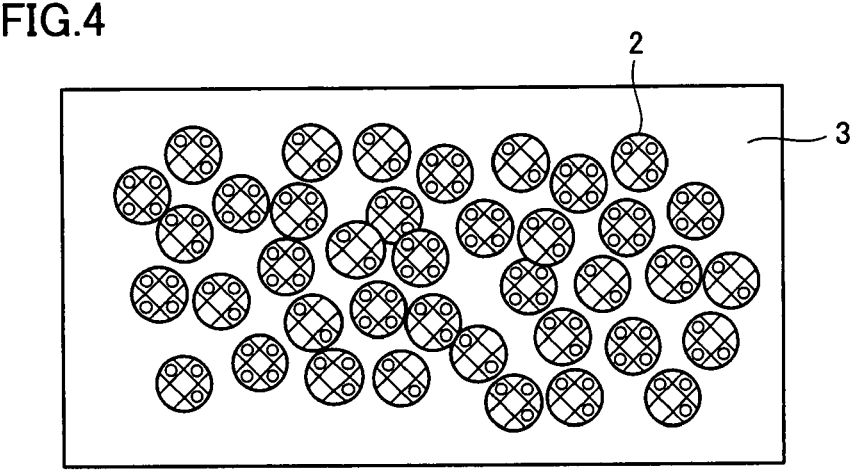
FIG. 4 is a schematic diagram showing the state in which a biodegradable resin cross-linking product powder prepared by a manufacturing method according to an aspect of the present invention is immersed in an impregnant.
Figure 5:
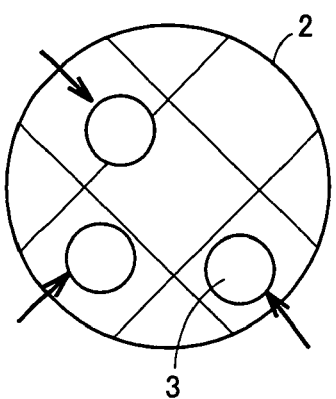
FIG. 5 is a magnified schematic diagram microscopically indicating the state shown in FIG. 4.

Subsequently, as shown in FIG. 4, the thus produced biodegradable resin cross-linking product powder 2 is immersed into a heated liquid impregnant 3 composed of the plasticizer or the polymerizable monomer in the step (D).

As described above, the step (D) can also be carried out by the heating under the condition in which the biodegradable resin cross-linking product powder 2 is allowed to contain the impregnant 3 without immersion in an excessive amount of impregnant 3.

When the impregnant is heated, the mobility of the impregnant is increased and, in addition, the cross-linking network becomes flexible so as to increase the permeability. Therefore, the liquid impregnant 3 is impregnated into the biodegradable resin cross-linking product powder 2.

In this manner, the impregnant 3 is impregnated into the network of each particle of the biodegradable resin cross-linking product powder 2, and the biodegradable resin cross-linking product powder 2 is brought into the state of being swelled. This state is schematic indicated in FIG. 5.

Figure 6:
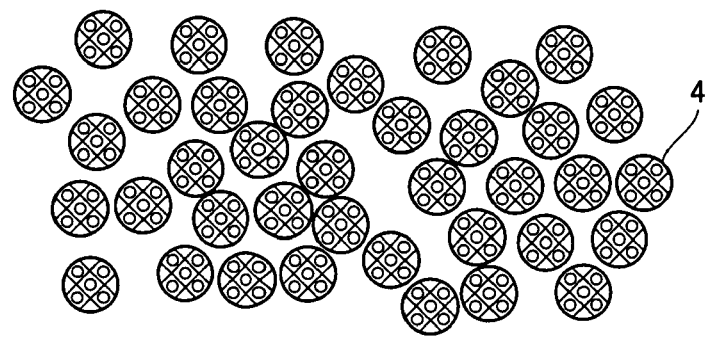
FIG. 6 is a schematic diagram of a biodegradable resin composite powder prepared by a manufacturing method according to an aspect of the present invention.
Figure 7:
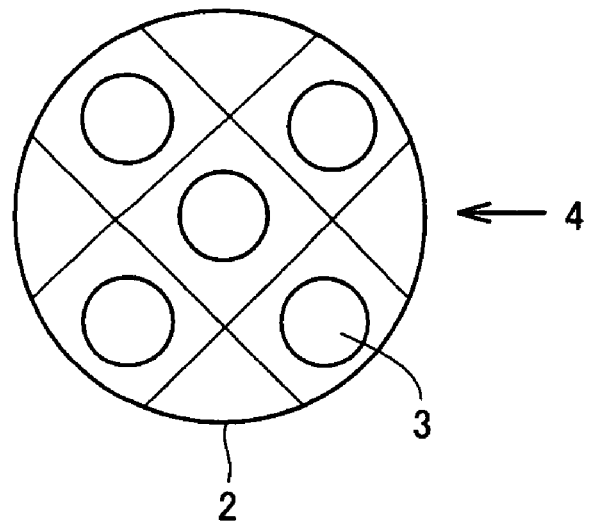
FIG. 7 is a magnified schematic diagram microscopically indicating the biodegradable resin composite powder shown in FIG. 6.

When cooling is carried out so as to return to room temperature while the biodegradable resin cross-linking product powder 2 is in the state of being swelled with the impregnant 3, a biodegradable resin composite powder 4, as shown in FIG. 6 and FIG. 7, is produced.

Figure 8:
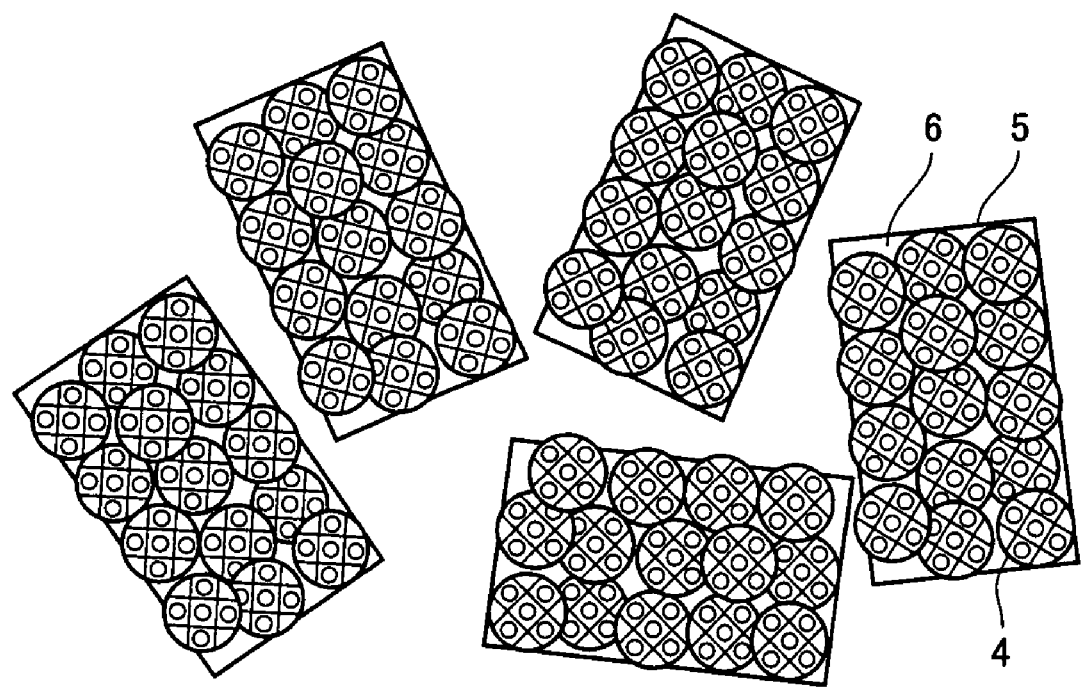
FIG. 8 is a schematic diagram of a biodegradable resin composite, in which a biodegradable resin composite powder and a biodegradable binder are compressed into pellets, prepared by a manufacturing method according to an aspect of the present invention.

The resulting biodegradable resin composite powder 4 and a biodegradable binder 6 are heated and solidified into the shape of pellets, so that a pellet-shaped biodegradable resin composite 5 of the present invention, as shown in FIG. 8, is produced.

The shape of pellet is adopted on the ground that in actual, industrial molding, e.g., extrusion molding, injection molding, and inflation molding, of resin molded parts now, pellets having a size of, for example, a few mm are easy to use during the molding as compared with the shape of powder.

Finally, a biodegradable resin molded part can be produced in a step (F) by using a molding material composed of any one of the biodegradable resin cross-linking product powders and the powder-shaped or pellet-shaped biodegradable resin composites of the above-described first to sixth embodiments.

Specifically, the above-described molding material is softened by heating, and is molded into a desired shape, e.g., a sheet, a film, a fiber, a tray, a container, or a bag, by using a common molding method, e.g., melt-extrusion molding, injection molding, inflation molding, rolling molding, and calender molding, for molding thermoplastic, so that a molded part can be formed.

In contrast to the above-described sixth embodiment, pellets of a mixture of the biodegradable resin composite powder and the biodegradable binder may not be prepared, but these may be mixed directly and heated so as to be molded into a molded part, e.g., a sheet or a tube.

It is possible to mold the biodegradable resin composite powder alone without adding the biodegradable binder. However, preferably, the biodegradable binder is added because the adhesion between the powder is enhanced and the moldability is improved.

EXAMPLES

The present invention will be specifically described below with reference to Examples and Comparative examples. However, the present invention is not limited to these Examples only.

Example 1

Polylactic acid "LACEA H440 (trade name)" produced by Mitsui Chemicals, Inc., was used as the biodegradable resin component. Triallyl isocyanurate "TAIC®", which is one type of allyl cross-linkable monomer, produced by Nippon Kasei Chemical Co., Ltd., was prepared as the cross-linkable monomer. The cross-linkable monomer was added to the biodegradable resin component by using an extruder (Model PCM30 produced by Ikegai Machinery Co.) and by dropping the cross-linkable monomer at a constant rate with a peristaltic pump into a pellet supply portion of the extruder when the biodegradable resin component was melt-extruded at a cylinder temperature of 180° C. At that time, the amount of addition was adjusted in such a way that the amount of blending of the cross-linkable monomer became 5 parts by mass relative to 100 parts by mass of biodegradable resin component. The extruded rod-shaped material was water-cooled and, thereafter, was pelletized with a pelletizer, so that a pellet-shaped kneaded product of the biodegradable resin component and the cross-linkable monomer was produced (step (A)).

The resulting kneaded product was subjected to a pulverizing step (step (C)) of pulverizing for 5 minutes in liquid nitrogen with a freeze pulverizer Model 6700 produced by SPEX (USA), so that a powder composed of a kneaded product of the biodegradable resin component and the cross-linkable monomer was produced. The resulting powder was subjected to a cross-linking step (step (B)) of applying 90 kGy of electron beam with an electron beam accelerator (acceleration voltage 10 MeV, amount of current 12 mA) in an inert atmosphere, from which the air was removed, so that a biodegradable resin cross-linking product powder was produced.

The resulting biodegradable resin cross-linking product powder was mixed with an equal mass of impregnant, and was heated in a hermetically sealed container, so that the biodegradable resin cross-linking product powder was impregnated with the impregnant (step (D)). For the impregnant, glycerin-based plasticizer "PL-710 (trade name)", which is a plasticizer containing a glycerin derivative as a primary component, produced by Riken Vitamin Co., Ltd., was used. Heating was carried out by standing in a constant temperature bath at 120° C. for 1 hour. The container was vibrated by being shaken with a hand for about 10 seconds every 15 minutes. Thereafter, the hermetically sealed container was taken off the constant temperature bath and was stood to cool to room temperature.

A powder of polylactic acid "LACEA H440 (trade name)" freeze-ground similarly to the above-described kneaded product in advance was used as the biodegradable binder, and was mixed into the above-described biodegradable resin composite powder in such a way that biodegradable resin composite powder:polylactic acid becomes 4:1 (by weight). Finally, the resulting kneaded product was hot pressed at 180° C., so that a molded part composed of a sheet having a thickness of 500 μm was produced.

Example 2

Example 2 was carried out as in Example 1 except that the pulverizing step (step (C)) was carried out after the cross-linking step (step (B)).

Example 3

Example 3 was carried out as in Example 1 except that the powder of polylactic acid "LACEA H440™" serving as the biodegradable binder was not mixed.

Example 4

A pellet-shaped kneaded product was produced in a manner similar to that in Example 1. Thereafter, the resulting pellet-shaped kneaded product was ground with an impact pulverizer atomizer mill, and was classified with a 425-μm sieve at 95% pass, so that a powder of a kneaded product composed of the biodegradable resin component and the cross-linkable monomer was produced. The resulting powder was irradiated with 120 kGy of electron beam from an electron beam accelerator (acceleration voltage 10 MeV, amount of current 12 mA) in an inert atmosphere, from which the air was removed, so that a biodegradable resin cross-linking product powder was produced.

The resulting biodegradable resin cross-linking product powder was mixed with an equal mass of impregnant, and was heated in a hermetically sealed container (step (D)). For the impregnant, methyl methacrylate monomer (produced by Wako Pure Chemical Industries, Ltd.), which is a polymerizable monomer, was used. Heating was carried out in a constant temperature bath at 80° C. for 1 hour. The container was vibrated by being shaken with a hand for about 10 seconds every 15 minutes. Thereafter, the hermetically sealed container was taken off the constant temperature bath and was stood to cool to room temperature. Subsequently, 60 kGy of electron beam was applied (step (E)) under the same irradiation condition as that in the cross-linking step-(step (B)), so that a biodegradable resin composite powder of Example 4 was produced.

A powder of polylactic acid "LACEA H440 (trade name)" freeze-ground similarly to the above-described kneaded product in advance was used as the biodegradable binder, and was mixed into the above-described biodegradable resin composite powder in such a way that biodegradable resin composite powder:polylactic acid becomes 4:1 (by weight). Finally, the resulting kneaded product was hot pressed at 180° C., so that a molded part composed of a sheet having a thickness of 500 μm was produced.

Example 5

Example 5 was carried out as in Example 4 except that glycidyl methacrylate monomer (produced by Wako Pure Chemical Industries, Ltd.) was used as the cross-linkable monomer.

Comparative Examples 1 and 2

Comparative example 1 was carried out as in Example 1 except that the pulverizing step (step (C)) was not carried out, and the immersion into the impregnant was carried out in the state of pellets. Since the impregnation of the impregnant was unsatisfactory in Comparative example 1, Comparative example 2 was carried out as in Comparative example 1 except that the heating time was 12 hours.

Comparative Example 3

Comparative example 3 was carried out as in Example 1 except that the cross-linking step through the use of the electron beam irradiation (step (B)) was not carried out.

In Examples and Comparative examples, the gel fraction of the kneaded product composed of the biodegradable resin cross-linking product or biodegradable resin component and the cross-linkable monomer before impregnation of the impregnant was evaluated by the following method. The impregnant content or the impregnant fixing ratio of the biodegradable resin composite after impregnation of the impregnant was evaluated by the following method.

(1) Evaluation of Gel Fraction

The dry mass of each sample was weighed accurately. The sample was wrapped with 200-mesh stainless steel gauze, and was boiled for 48 hours in a chloroform solution. Thereafter, the sol portion dissolved into chloroform was removed so as to leave the gel portion. The resulting gel portion was dried at 50° C. for 24 hours to remove chloroform from the gel, and the dry mass of the gel portion was measured. The gel fraction was calculated from the measured values on the basis of the following equation.

gel fraction(percent by mass)=(gel portion dry mass/sample dry mass)×100

(2) Evaluation of Impregnant Content

In Examples and Comparative examples, the mass of a sample before being mixed with the impregnant was measured at ambient temperature in advance. After the sample was impregnated with the impregnant, the temperature was returned to ambient temperature, and the mass of the sample was measured. The impregnant content was calculated from the resulting values on the basis of the following equation.

impregnant content(percent by mass)={(A−B)/A}×100

A: mass of sample after being impregnated with impregnant and returned to ambient temperature B: mass of sample at ambient temperature before being mixed with impregnant (3) Flexibility Evaluation With respect to Examples and Comparative examples in which a sheet was able to be prepared, the state of the sheet when the sheet was wound around a stainless steel round bar having an outer diameter of 10 mm without gap was observed.

The flexibility was evaluated, and a sheet, which was able to be wound with no cracking of the sheet nor change in the shape between before and after the winding, was indicated by "A", a sheet, which was able to be wound although some changes, e.g., cracking, were observed in a part of the sheet, was indicated by "B", and a sheet, which was unable to be wound because the sheet was hard and which was cracked when being forced to wind, was indicated by "C".

A case where no sheet was able to be prepared was indicated by "no sheet was formed".

The results of the above-described evaluation are collectively shown in Table 1 together with differences in the production condition.

TABLE 1

| | Type of impregnant | Cross-linking step (step B) | Pulverizing step (step C) | Order of step B and step C | Polymerization step of polymerizable monomer (step E) | Impregnation temperature and time of impregnant | Gel fraction (percent by mass) | Impregnant content (percent by mass) | Flexibility evaluation |
|---|---|---|---|---|---|---|---|---|---|
| Example 1 | glycerin-based plasticizer "PL-710" | electron beam irradiation (90 kGy) | freeze pulverizing | C→B | none | 120° C., 1 hour | >99 | 50 | A |
| Example 2 | | | | B→C | | | | | A |
| Example 3 | | | | C→B | | | | | B |
| Example 4 | methyl methacrylate | electron beam irradiation | impact pulverizing | C→B | electron beam irradiation | 80° C., 1 hour | | | A |

TABLE 1-continued

| | Type of impregnant | Cross-linking step (step B) | Pulverizing step (step C) | Order of step B and step C | Polymerization step of polymerizable monomer (step E) | Impregnation temperature and time of impregnant | Gel fraction (percent by mass) | Impregnant content (percent by mass) | Flexibility evaluation |
|---|---|---|---|---|---|---|---|---|---|
| Example 5 | glycidyl methacrylate | (120 kGy) | | | (60 kGy) | | | | C |
| Comparative example 1 | glycerin-based | electron beam irradiation | none | B alone | none | 120° C., 1 hour | | 8 | no sheet was formed |
| Comparative example 2 | plasticizer "PL-710" | (90 kGy) | | B alone | | 120° C., 12 hours | | 50 | |
| Comparative example 3 | | none | freeze pulverizing | C alone | | 120° C., 1 hour | <1 | <1 | — |

In each of Examples 1 to 5, the sheet of the biodegradable resin composite containing the impregnant was produced. In Examples 1 to 4, flexible and elastic sheets as compared with the raw material of the biodegradable resin component were produced. Conversely, in Example 5, very hard sheet was produced. In this manner, biodegradable resin molded parts having different hardnesses in accordance with the impregnants to be used were able to be produced.

As compared with Examples 1 to 5, in Comparative example 1 in which the pulverizing step (step (C)) was not carried out, the swelling of the biodegradable resin cross-linking product with the impregnant was inadequate and, therefore, the flexibility was poor. In addition, molding into a sheet-shaped molded part was not able to be carried out because the biodegradable resin cross-linking product was not made into a powder.

Furthermore, in Comparative example 2, in which heating was carried out for a long time to facilitate the swelling with the impregnant, although the impregnant was able to be impregnated, a sheet-shaped molded part was not able to be produced because the biodegradable resin cross-linking product was not made into a powder.

In Comparative example 3, in which the cross-linking of the biodegradable resin component (step (B)) was not carried out, impregnation of the impregnant was not able to be carried out. Therefore, there was no point in making into a sheet, so that no sheet was prepared.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for manufacturing a molding material, the method comprising:
    a biodegradable resin cross-linking product powder preparation step of preparing a biodegradable resin cross-linking product powder, the step including:
        a step (A) of preparing a kneaded product containing a biodegradable resin component and a cross-linkable monomer;
        a step (B) of cross-linking the biodegradable resin component to form a biodegradable resin cross-linking product;
        a step (C) of pulverizing the kneaded product or the biodegradable resin cross-linking product into a powder; and
    a biodegradable resin composite powder preparation step of preparing a biodegradable resin composite powder, the step including:
        a step (D) of swelling the biodegradable resin cross-linking product powder with an impregnant containing a polymerizable monomer to impregnate the biodegradable resin cross-linking product powder with the impregnant,
    wherein the impregnant in the impregnation is set at a temperature of 60° C. or higher, and lower than or equal to the melting point or the degradation temperature of the biodegradable resin component.

2. The method for manufacturing a molding material according to claim 1, wherein the step (A), the step (B), and the step (C) are carried out in that order, and the biodegradable resin cross-linking product is ground into a powder in the step (C).

3. The method for manufacturing a molding material according to claim 1, wherein the step (A), the step (C), and the step (B) are carried out in that order, and the kneaded product is ground into a powder in the step (C).

4. The method for manufacturing a molding material according to claim 1, wherein the cross-linking in the step (B) is carried out by application of ionizing radiation.

5. The method for manufacturing a molding material according to claim 1, wherein the impregnant is the polymerizable monomer, and the polymerizable monomer comprises at least one of the types described in the following items (e) to (i):
    (e) an acrylic monomer or/and a low-molecular weight polymer having acrylic groups;
    (f) a methacrylic monomer or/and a low-molecular weight polymer having methacrylic groups;
    (g) a styrene-based monomer;
    (h) an allyl monomer or/and a low-molecular weight polymer having allyl groups; and
    (i) a vinyl carboxylate-based monomer.

6. The method for manufacturing a molding material according to claim 1, wherein the impregnant is the polymerizable monomer, and the biodegradable resin composite powder preparation step further includes a step (E) of polymerizing the impregnant after the step (D).

7. The method for manufacturing a molding material according to claim 6, wherein in the step (E), the polymerizable monomer is allowed to graft-polymerize with sites derived from the biodegradable resin component in the biodegradable resin cross-linking product powder by using radicals generated in the step (B).

8. The method for manufacturing a molding material according to claim 6, wherein the cross-linking in the step (B)

and/or the polymerization in the step (E) are carried out by application of ionizing radiation.

9. The method for manufacturing a molding material according to claim 1, further comprising the step of preparing a mixture of the biodegradable resin composite powder and a biodegradable binder.

10. The method for manufacturing a molding material according to claim 9, further comprising the step (F) of heating the mixture to a temperature higher than or equal to the melting point of the biodegradable resin component so as to pelletize.

* * * * *